June 27, 1944. E. H. KOCHER 2,352,209
LUBRICATION
Filed March 18, 1940
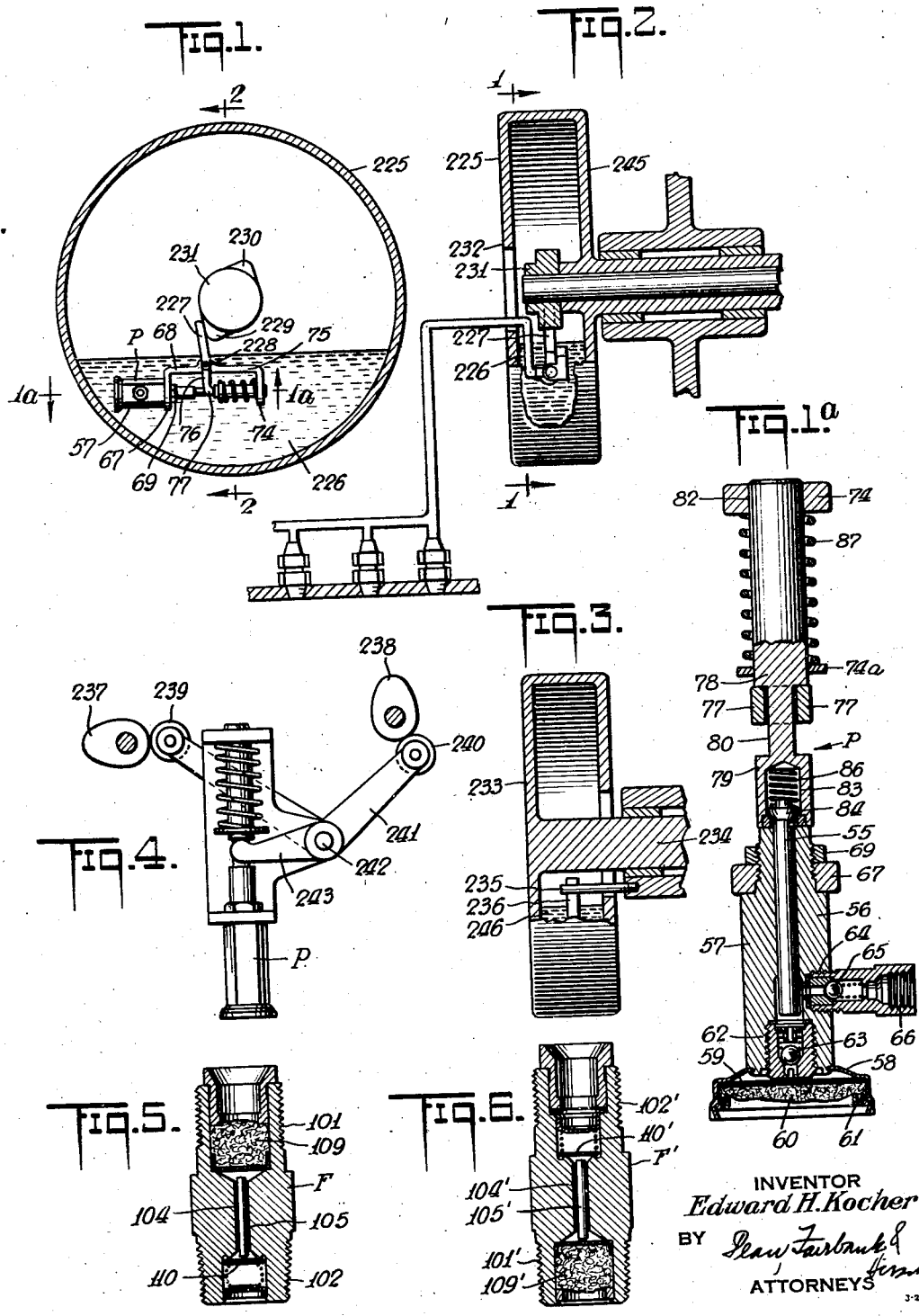
INVENTOR
Edward H. Kocher
BY
ATTORNEYS Patented June 27, 1944

2,352,209

UNITED STATES PATENT OFFICE 2,352,209

LUBRICATION

Edward H. Kocher, Boonton, N. J., assignor to Auto Research Corporation, a corporation of Delaware Application March 18, 1940, Serial No. 324,465

6 Claims. (Cl. 184—6)

The present invention relates to centralized lubricating installations and it particularly relates to a centralized lubricating installation in which a plurality of distributed bearings are supplied with lubricant from a central source.

Although not restricted thereto, the present invention will be particularly described in its application to the centralized lubrication of machine tools by a distributing system having a central automatically actuated pump fed from a central reservoir, which in turn feeds a distributing piping system having a plurality of high restriction flow metering outlets for affording a tremendously greater restricting or obstructing effect to the flow of lubricant than is encountered either in the tubing or piping system or in the bearings to be lubricated.

Among the centralized lubricating systems which may be utilized are those of the type set forth and described in Patents 1,632,771, 1,632,772, 1,732,212, 1,746,139, and in applications Serial No. 745,187, filed September 24, 1934; and Serial No. 30,462, filed July 9, 1935.

In many types of machine tools the amount of space available for the location of a reservoir and pump is quite limited and great difficulty is experienced in positioning such reservoir and pump so that it will not interfere with other mechanism or parts of the machine and so that it may be unitarily assembled with the machine during or after manufacture.

Although the pump and reservoir should form a unitary part of the machine, nevertheless it should be readily accessible for repair or replacement and also for replenishment of the lubricant.

It is among the objects of the present invention, therefore, to provide an improved centralized lubricating installation, particularly designed for machine tools, of the character above described, which will be compactly and unitarily assembled with the machine and yet, at the same time, will be readily accessible for repair, replacement and replenishment of lubricant.

Still further objects and advantages will appear from the more detailed description set forth below, it being understood, however, that this more detailed description is given by way of illustration, since various changes therein may be made by those skilled in the art without departing from the scope and spirit of the invention.

In accomplishing the above objects it is found most suitable, according to one form of the invention, to provide a pump structure including an elongated metal body forming the cylinder, having an unpacked elongated metallic plunger, which pump is carried by a U-shaped bracket, one leg of which is connected to the pump body and the other leg of which forms a bearing or mount for a reciprocating connecting rod or actuating member.

This bracket is also preferably provided with an extension bolted or otherwise connected to part of the machine housing and preferably to the interior of a chamber which may serve as a lubricant reservoir and in the preferred form this bracket also has a bearing mount for a lever, which, at one end, reciprocates the connecting rod and at the other end is actuated by a rotating element in the machine mechanism.

In the drawing which shows several specific embodiments of the present invention by way of illustration, but to the details of which the present invention is by no means restricted, since many changes and alterations are possible, Fig. 1 is an end sectional view of a mechanism with a rotating head showing the pump and reservoir construction formed as a unitary part of the machine, said view being taken upon the line 1—1 of Fig. 2, Fig. 1a is a longitudinal sectional view upon the line 1a—1a of Fig. 1, showing the pump construction upon an enlarged scale, Fig. 2 is a transverse sectional view upon the line 2—2 of Fig. 1 showing the end portion of the machine mechanism, and showing diagrammatically the associated distributing system, Fig. 3 is a view similar to Fig. 2 of an alternative construction where the head opening has been reversed, Fig. 4 is an elevational view of still another embodiment showing the pump actuated by two elements of the mechanism, Fig. 5 is a longitudinal sectional view, illustrating one type of a flow metering outlet fitting which may be utilized.

Fig. 6 illustrates another type of a flow metering outlet fitting.

In Figs. 1 and 2 are diagrammatically shown a head of a Gleason spiral bevel gear generator.

The pump structure P may be enclosed in the casing or rocking head 225 which contains a body of oil 226. The lever 227 pivoted at 228 will then be actuated by the lobes 229 and 230 on the cam 231.

If desired, both the shaft of the cam 231 and the drum 225 may rotate at different speeds in respect to each other, or the drum may stand still and the cam rotate.

As is apparent from the sectional view shown in Fig. 2, the front of the drum is annularly closed, as indicated at 232, so as to always retain the body of oil 226 in the lower part thereof. The pump will therefore always be immersed when the lever 227 is being actuated by either one or both of the lobes 229 and 230.

The pump structure of Fig. 1 is best shown in Fig. 1a and it will be noted that it is horizontally positioned within the rocking head 225.

The pump P is provided with a piston 55 received in a cylinder 56 in the hexagonal block 57. To the lower part of the cylinder block is connected the cup 58, in which is positioned the wire gauze 59 and the felt filter 60, both being held in position by the fastener ring 61.

In a pocket at the lower end of the block 57 is formed a valve chamber 62 receiving the valve 63, which serves as an inlet valve to check return flow of lubricant past the filter 60. The side of the pump block 57 is provided with an outlet port 64 connecting with the spring seated outlet valve 65, which in turn is connected to the pipe (not shown) at the outlet socket 66.

The cylinder block 57 is held on the base 245 of the drum 225 by the U-shaped support or carrier member 68, the nut 69 holding said cylinder block 57 in position upon flange 67.

The upper part of the carrying structure 68 for the pump P (see Fig. 1) is provided with a base 75 which in turn carries the oscillating actuating arm 227. The lower end 76 of the arm 227 is provided with a clevis member 77, fitting between the enlargements 78 and 79 on the connecting rod 80.

The upper enlargement rides in the bore 82 in the flange 74. The lower enlargement 79 is provided with a recess 83, in which is received the enlargement 84 on the end of the piston 55, said enlargement 84 being pressed against one end of said recess by the spring 86. Spring 87 reacts against the flange 74 and 74a and presses the piston 55 to its extreme discharge position.

In operating the system of the present invention it has been found most satisfactory to use a good grade of machine oil, that is, clear mineral oil of 300 to 800 Saybolt seconds viscosity at 100 degrees F.

Although many different sizes of pumps and types of pumps may be utilized, one preferred form of pump is one with a piston diameter of ¼ inch, a stroke of ½ inch, and arranged to have one stroke for every ½ revolution of the head 225.

In Fig. 3, which diagrammatically shows a portion of a Gleason straight bevel gear generator, is shown an arrangement in which the drum or rocking head 233 is rotated by the shaft 234 while the pump structure P is immersed in the oil and is actuated by cooperation of the elements 235 and 236.

In Fig. 4, which diagrammatically shows a pump for a Lodge & Shipley lathe, two cams 237 and 238 may be utilized to actuate the follower members 239 and 240 respectively on the bell crank lever 241, which is pivoted at 242. The bell crank lever being provided with an extension 243 which oscillates the pump P.

In the construction of Fig. 4, the rocker arm 243 is operated alternately by either of the two eccentrics or cams 237 or 238, one of which may be mounted on a shaft actuating the longitudinal feed of the carriage, while the other may be operated on a shaft actuating the transverse feed of the carriage. This type of installation is most satisfactory where it is not satisfactory to operate the pump only from the longitudinal feed shaft because of the fact that the longitudinal feed shaft may not rotate at a sufficient speed or where the carriage may not move longitudinally a sufficient amount of times to give the required feed of lubricant.

Although many different types of flow metering devices may be utilized, it has been found most satisfactory to employ the type of flow metering devices shown in Figs. 5 and 6.

In Fig. 5 the straight drip plug or metering fitting body F is threaded with a machine thread at the inlet end 101 and a pipe thread at the outlet end 102. The drip plug is provided with a central bore 104 substantially completely filled by the pin 105. The pin 105 leaves a crevice of one or more thousandths of an inch which determines the restriction effect and metering rating of the fitting.

The inlet end of the drip plug is provided with a socket receiving the filter 109 and the outlet end is provided with a socket receiving the check valve 110. The inlet end of the fitting may be connected to a junction or to a pipe.

The reversed device of Fig. 6 has the machine thread 102 at its outlet end and the pipe thread 101 at its inlet end. In the device of Fig. 6 corresponding parts to those of Fig. 7 are indicated by the same numerals and letters primed.

Other types of drip plugs than those shown may be employed or other metering fittings, such as measuring valves, and various types are more fully described in Patents Nos. 1,632,772, 1,734,026 and 1,734,027, as may also other metering fittings such as disclosed in copending application, Serial No. 580,668, filed August 9, 1922, Patent No. 1,975,920, and Serial No. 596,856, filed October 25, 1922, Patent No. 2,017,848.

The present application is a continuation in part of applications Serial No. 745,187, filed September 24, 1934, and Serial No. 30,462, filed July 9, 1935, and Figs. 1a, 1, 2, 3, 4 and 7 respectively correspond or are similar to Figs. 2, 10, 11, 12, 13 and 4 of said prior filed application Serial No. 745,187, now Patent No. 2,229,095.

The invention is not intended to be restricted to any particular construction or arrangement of parts, or to any particular application of any such construction, or to any specific method of operation, or manner of use, or to any of various details thereof, herein shown and described, as the same may be modified in various particulars or be applied in many varied relations without departing from the spirit and scope of the claimed invention, the practical embodiments herein illustrated and described merely showing some of the various features entering into the application of the invention.

What is claimed is:

1. In a centralized lubricating installation for a machine having a plurality of spaced and distributed bearings requiring lubrication during operation of the machine, said installation including a central lubricant reservoir, a central lubricant pump, a branched conduit system with an inlet from said pump and a plurality of outlets to said bearings, said system being provided with means to control the distribution of the lubricant among said bearings; an automatic actuator operated to cause said pump to charge with lubricant from the reservoir and discharge it into said system during operation of said machine, said reservoir including a pivotally mounted container driven by said machine, said pump rocking with said container and including a reciprocating plunger, and said actuator including an actuating lever and means to reciprocate said lever.

2. The combination recited in claim 1 in which the plunger is operated by the actuator in one direction and has a spring for effecting the return stroke thereof.

3. In a centralized lubricating installation for a machine tool having a plurality of spaced and distributed bearings requiring lubrication during operation of the machine tool, said installation including a branched conduit system with an inlet and a plurality of outlets to said bearings, said outlets being each provided with a high restriction flow metering fitting to control the distribution of the lubricant among said bearings; a central source of lubricant pressure including a reservoir, an elongated unpacked small diameter plunger pump in said reservoir connected to said inlet, an automatic actuator operated to cause said pump to charge with lubricant from the reservoir and discharge it into said system during operation of said machine, said plunger being provided with a return spring, said actuator including a lever pivotally mounted on the pump structure, said machine tool being provided with a rocking head and said rocking head serving as the reservoir for said pump.

4. In a centralized lubricating installation for a machine tool having a plurality of spaced and distributed bearings requiring lubrication during operation of the machine tool, said installation including a branched conduit system with an inlet and a plurality of outlets to said bearings, said outlets being each provided with a high restriction flow metering fitting to control the distribution of the lubricant among said bearings; a central source of lubricant pressure including a reservoir, an elongated unpacked small diameter plunger pump in said reservoir connected to said inlet, an automatic actuator operated to cause said pump to charge with lubricant from the reservoir and discharge it into said system during operation of said machine, said plunger being provided with a return spring, said actuator including a lever pivotally mounted on the pump structure, said machine tool being provided with a rocking head serving as the reservoir and said pump being mounted to move with said rocking head and said automatic actuator including a contacting element for actuating the lever, which contacting element does not rock with said head and has relative motion in respect to said pump structure.

5. In a centralized lubricating installation for a machine tool having a plurality of spaced and distributed bearings requiring lubrication during operation of the machine tool, said machine also being provided with an enlarged cylindrical cup-like head receiving a body of lubricant and with a central shaft extending into the central portion of said head and means to rotate said shaft and rock said head, said installation including a branched conduit system with an inlet and a plurality of outlets to said bearings, said outlets being each provided with a high restriction flow metering fitting to control the distribution of the lubricant among said bearings; a central source of lubricant pressure including a reservoir, an elongated unpacked small diameter plunger pump in said reservoir connected to said inlet, an automatic actuator operated to cause said pump to charge with lubricant from the reservoir and discharge it into said system during operation of said machine, said plunger being provided with a return spring, said actuator including a lever pivotally mounted on the pump structure, said pump being mounted in said head adjacent the lower part thereof and said automatic actuator including a cam mounted on said central shaft.

6. In a centralized lubricating installation for a machine tool having a plurality of spaced and distributed bearings requiring lubrication during operation of the machine tool, said machine tool being provided with a cup-like hollow head receiving a body of lubricant and being also provided with a shaft projecting into said head, said installation including a branched conduit system with an inlet and a plurality of outlets to said bearings, said outlets being each provided with a high restriction flow metering fitting to control the distribution of the lubricant among said bearings; a central source of lubricant pressure including a reservoir, a pump mounted in said head in the body of lubricant therein, having an elongated unpacked small diameter plunger and connected to said inlet, an automatic actuator operated to cause said pump to charge with lubricant from the reservoir and discharge it into said system during operation of said machine, said plunger being provided with a return spring, said actuator including a lever pivotally mounted on the pump structure, and also including a cam on said shaft operating said lever.

EDWARD H. KOCHER.